US 9,258,598 B2

(12) United States Patent
Sakuma

(10) Patent No.: US 9,258,598 B2
(45) Date of Patent: Feb. 9, 2016

(54) VIDEO DISPLAY SYSTEM, INFORMATION PROCESSING APPARATUS AND VIDEO DISPLAY APPARATUS

(75) Inventor: Shigeo Sakuma, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 564 days.

(21) Appl. No.: 13/614,064

(22) Filed: Sep. 13, 2012

(65) Prior Publication Data
US 2013/0009922 A1     Jan. 10, 2013

Related U.S. Application Data

(63) Continuation of application No. PCT/JP2010/054554, filed on Mar. 17, 2010.

(51) Int. Cl.
G06F 3/00 (2006.01)
G06F 3/038 (2013.01)
H04N 21/433 (2011.01)
G06F 3/14 (2006.01)
G09G 5/00 (2006.01)
H04N 21/41 (2011.01)

(52) U.S. Cl.
CPC ............. *H04N 21/4333* (2013.01); *G06F 3/14* (2013.01); *G09G 5/006* (2013.01); *G09G 2370/04* (2013.01); *G09G 2370/12* (2013.01); *G09G 2370/22* (2013.01); *H04N 21/4122* (2013.01)

(58) Field of Classification Search
None
See application file for complete search history.

(56) References Cited

U.S. PATENT DOCUMENTS

| 2002/0021375 A1* | 2/2002 | Nakajima | G02F 1/136204 349/40 |
| 2003/0090590 A1* | 5/2003 | Yoshizawa et al. | 348/569 |
| 2003/0132941 A1* | 7/2003 | Echizenya | 345/520 |
| 2008/0152023 A1* | 6/2008 | Yoshida et al. | 375/257 |
| 2009/0086089 A1* | 4/2009 | Matsui et al. | 348/441 |

(Continued)

FOREIGN PATENT DOCUMENTS

| JP | 2003-209920 | 7/2003 |
| JP | 2004-272132 | 9/2004 |

(Continued)

OTHER PUBLICATIONS

English Translation of the International Preliminary Report on Patentability issued Nov. 1, 2012 in corresponding International Patent Application No. PCT/JP2010/054554.

(Continued)

*Primary Examiner* — Michael Sun
(74) *Attorney, Agent, or Firm* — Staas & Halsey LLP

(57) ABSTRACT

An information processing apparatus generating and outputting video signals, a video display apparatus connected to the information processing apparatus and displaying a video based on the video signals received from the information processing apparatus, and a video display system including the information processing apparatus and the video display apparatus, in which a display stop instruction signal is output from the information processing apparatus toward the video display apparatus via a signal line for transmitting, to the information processing apparatus, a connection signal indicating that the video display apparatus is connected to the information processing apparatus to stop and resume the display of the video without delay while preventing a malfunction, during which a pseudo connection signal is generated so that the video display apparatus is not deemed to be removed from the information processing apparatus.

4 Claims, 6 Drawing Sheets

(56) References Cited

U.S. PATENT DOCUMENTS

| | | | |
|---|---|---|---|
| 2009/0141197 A1* | 6/2009 | Kim | 348/790 |
| 2010/0020183 A1 | 1/2010 | Kimoto et al. | |
| 2010/0023145 A1* | 1/2010 | Yagura | G09G 5/003 700/94 |
| 2011/0221976 A1* | 9/2011 | Kikkawa | 348/739 |
| 2013/0009922 A1* | 1/2013 | Sakuma | 345/204 |

FOREIGN PATENT DOCUMENTS

| | | |
|---|---|---|
| JP | 2007-288407 | 11/2007 |
| JP | 2008-158595 | 7/2008 |
| JP | 2009-100456 | 5/2009 |
| JP | 2010-28454 | 2/2010 |
| JP | 2010-28553 | 2/2010 |

OTHER PUBLICATIONS

Extended European Search Report, dated Jul. 18, 2013, in corresponding European Application No. 10847873.6 (7 pp.).

International Search Report of PCT/JP2010/054554 mailed Apr. 13, 2010.

Office Action mailed Mar. 31, 2015 for corresponding Chinese Patent Application No. 201080065474.4.

* cited by examiner

VIDEO DISPLAY SYSTEM, INFORMATION PROCESSING APPARATUS AND VIDEO DISPLAY APPARATUS

CROSS-REFERENCE OF RELATED APPLICATION

This application is a continuation application of International Application PCT/JP2010/054554 filed on Mar. 17, 2010, the entire contents of which are incorporated herein by reference.

FIELD

The present invention relates to an information processing apparatus generating and outputting video signals, a video display apparatus connected to the information processing apparatus and displaying a video based on the video signals received from the information processing apparatus, and a video display system including the information processing apparatus and the video display apparatus.

BACKGROUND

With technical advancements of digital video display apparatuses being tremendous such as starting from about 320× 200 dots as a resolution for displaying alphanumeric characters and ending now to a density as high as 1920×1080 dots (pixels), these digital video display apparatuses are connected to personal computers in ordinary households. There also exist the digital video display apparatuses having resolutions such as 8192×4320 dots and 7680×4320 dots by standard. Historically, however, the information processing apparatuses do not perform displaying with such high resolutions from the beginning.

Especially, the personal computer performs displaying with 640×480 dots as a basic resolution when booted and properly increases the resolution with starting an OS (Operating System).

In televisions, the basic resolutions (640×480 dots, 720× 480 dots, 1280×720 dots) are predetermined. There exist many cases in which any one of these resolutions is switched over to another in the midst of displaying the video.

On the occasion of changing the resolution, video display signals and clock signals are temporarily stopped on the side of the information processing apparatus, and the signals with an increased resolution are output again. When resuming the output of the signals, however, the output of the signals is resumed without notifying the video processing apparatus.

Thus, in the case of the system with the resolution being switched over midway, when the resolution is switched over, the video signals coming from the information processing apparatus get into an unstable state in many cases. In the DVI (Digital Visual Interface) standard and the HDMI (High Definition Multimedia Interface) standard, there exists no interface that explicitly notifies the video display apparatus that the video display signals are stopped. Information on insertion and removal is transferred to and received from the video processing apparatus by use of +5 V power signals, while information on mutual connection is transferred to and received from the information processing apparatus by use of HPD (Hot Plug Detect) signals. These pieces of information are not information about whether the video is being output or not. Accordingly, it is unfeasible to restrain unstable video signals from being displayed for a short period of time when the resolution is switched over and to display the video quickly after being switched over. Therefore, the video display apparatus stops outputting the video by monitoring at all times that the clock signals are stopped.

When the resolution is switched over, a determination that the clock signals are stopped in the video display apparatus gets into a malfunction, and the unstable video is displayed in some cases.

In this case, a user might think that the information processing apparatus or the video display apparatus gets into a fault. Moreover, the video display apparatus displays a meaningless screen, resulting in consumption of futile electric power. Further, the video display apparatus receives the unstable signals, which might lead to destruction of an element in some cases.

When the video display signals are output again from the information processing apparatus in a clock stopping state, the video display apparatus monitors the clock signals, and hence it takes a period of time till determining that the clocks are stabilized. Therefore, it takes the time till the video is again displayed on the video display apparatus.

The power is supplied to the video display apparatus from the information processing apparatus via the +5 V terminal based on the DVI standard and the HDMI standard, and a signal of the +5 V terminal is used as a signal for notifying the video display apparatus that the information processing apparatus is connected. It is also developed to switch over or notify the video display/non-display of the video display apparatus by controlling the power signal line and the like in place of monitoring the stop of the clocks.

This system, however, mainly aims at supplying the electric power, and therefore a stray capacitance is extremely large, and the signal cannot be used as the signal for quickly switching over the video display/non-display. Further, the cut-off of the power source implies, i.e., that the interface is inserted and removed, so that communications for reading video processing apparatus information (EDID: Extended Display Identification Data) and for performing an authentication process (HDCP: High-Definition Content Protection) occur in the information processing apparatus immediately after the +5 V power signal has restored. This takes a period of time, and hence the quick switchover to the stable video cannot be attained.

Moreover, in the latest Display Port standard, the information processing apparatus and the video display apparatus perform the communications with each other via two terminals named "CONFIG", thus giving notification that the video output is started or stopped.

Many items of information are, however, transferred and received through these communications, and the communications are too complicated if used only for displaying the video very soon when canceling the display of an unspecified video and switching over the video and require a cost for achievement. Further, there is no extra signal pin in the DVI standard and the HDMI standard, and implementation thereof cannot be done.

The DVI terminal and the HDMI terminal, e.g., "DDC", "DATA/DDC" and "CLOCK" are changed to "CONFIG", in which case such problems are solved that the unspecified video is displayed and it takes the time till the video is displayed. There is, however, no compatibility with a combination of the information processing apparatus and the video display apparatus according to the DVI standard and the HDMI standard.

[Patent document 1]
Japanese Laid-Open Patent Publication No. 2007-288407
[Patent document 2]
Japanese Laid-Open Patent Publication No. 2004-272132

[Patent document 3]
Japanese Laid-Open Patent Publication No. 2003-209920

SUMMARY

According to an aspect of the embodiments, a video display system includes an information processing apparatus which outputs video signals, and a video display apparatus which is connected to the information processing apparatus and displays a video based on the video signals received from the information processing apparatus.

Herein, the information processing apparatus includes a first wire and a connection determining circuit.

The first wire is a wire to which a connection signal indicating a connection with the video display apparatus is supplied from the video display apparatus.

Further, the connection determining circuit is a circuit which determines based on a signal on the first wire whether the video display apparatus is connected or not.

Still further, the video display apparatus includes a connection signal generating circuit and a second wire.

Herein, the connection signal generating circuit generates the connection signal.

Further, the second wire is connected to the first wire, thereby supplying the connection signal to the first wire.

Herein, the information processing apparatus further includes a display control circuit, a drive circuit and a pseudo connection signal transmission circuit.

The display control circuit outputs a display stop instruction signal for giving an instruction to stop displaying the video on the video display apparatus.

Moreover, the drive circuit receives the display stop instruction signal and validates the display stop instruction signal from the connection signal on the first wire.

Further, the pseudo connection signal transmission circuit receives the display stop instruction signal and transmits a pseudo connection signal in place of the connection signal to the connection determining circuit.

Still further, the video display apparatus includes a display stop instruction detecting circuit.

The display stop instruction detecting circuit detects the display stop instruction signal transmitted to the second wire via the first wire.

Furthermore, the information processing apparatus according to an aspect of the embodiments is an information processing apparatus building up a video display system according to an aspect of the embodiments.

Moreover, the video display apparatus according to an aspect of the embodiments is a video display apparatus building up a video display system according to an aspect of the embodiments.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

A comparative example compared with an embodiment of the present invention will hereinafter be described in advance, and subsequently, the embodiment of the present invention will be discussed based on this comparative example.

Figure 1:
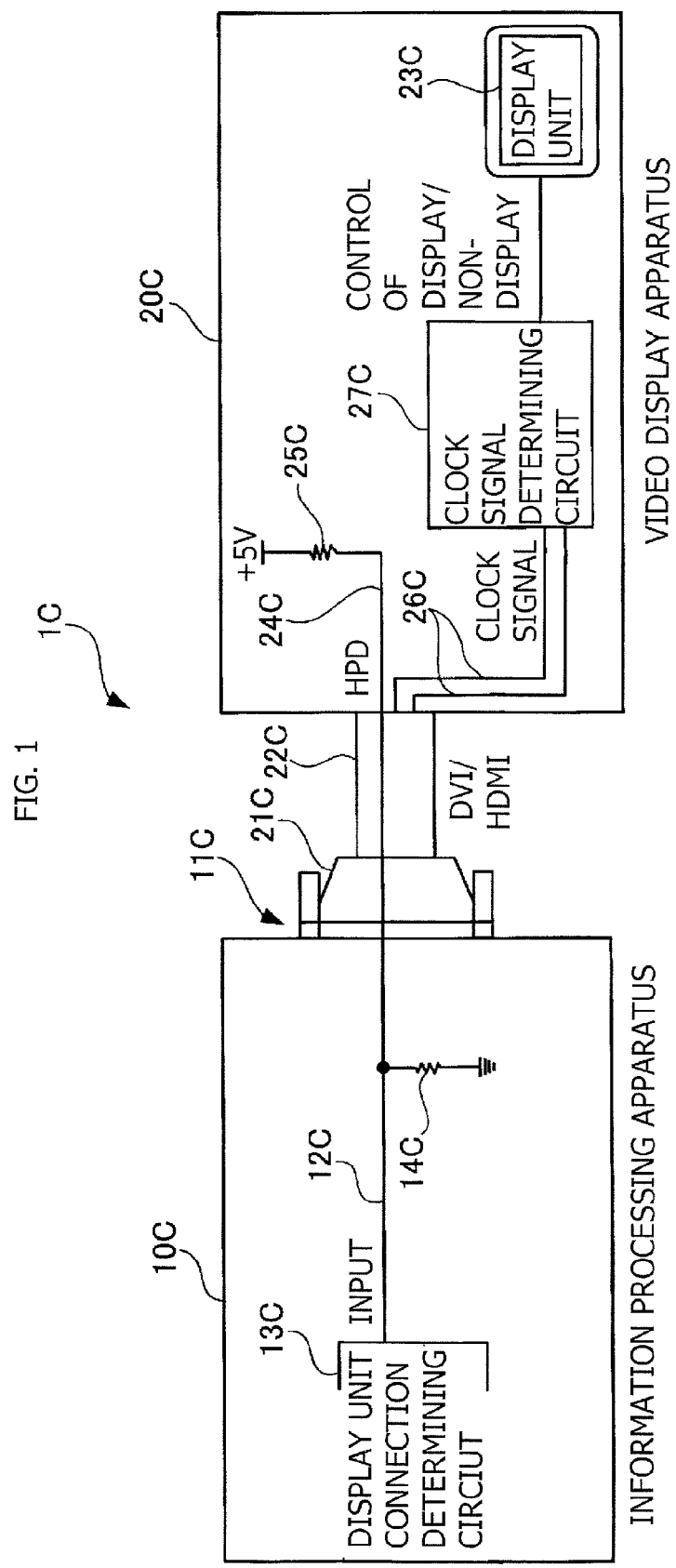
FIG. 1 is a block diagram illustrating a video display system by way of a comparative example.

FIG. 1 is a block diagram illustrating a video display system by way of the comparative example. FIG. 1 depicts only a portion to be compared with a characteristic portion of the present invention, while illustrations and explanations of other elements are omitted. Further, this is the same with the respective drawings illustrating the embodiment of the present invention that will be described later on. Moreover, in FIG. 1, a letter "C" is suffixed to each of the reference numerals in order to explicitly indicate (the elements of) the comparative example.

A video display system 1C depicted in FIG. 1 includes an information processing apparatus 10C and a video display apparatus 20C. The video display apparatus 20C has a connector 21C and a cable 22C, in which the connector 21C is connected to a connector 11C on the side of the information processing apparatus 10C, thereby connecting the video display apparatus 20C to the information processing apparatus 10C via the connectors 11C, 21C and the cable 22C.

The information processing apparatus 10C is an apparatus which generates video signals and outputs the video signals toward the video display apparatus 20C. Furthermore, the video display apparatus 20C is an apparatus which receives the video signals output from the information processing apparatus 10C and displays a video based on the video signals on a display unit 23C. The information processing apparatus 10C and the video display apparatus 20C perform communications based on the DVI or HDMI standard.

Further, the information processing apparatus 10C includes a first wire 12C and a display unit connection determining circuit 13C. The first wire 12C is grounded via a resistor 14C having a large resistance value. The first wire 12C is a wire for receiving the transmission of a connection signal indicating a connection of the video display apparatus 20C to the information processing apparatus 10C from the side of the video display apparatus 20C. Moreover, the display unit connection determining circuit 13C is a circuit which determines whether the connection of the video display apparatus 20C is established or not by monitoring the signal carried on the first wire 12C.

On the other hand, the video display apparatus 20C includes a second wire 24C and a resistor 25C. The second wire 24C is connected to the first wire 12C on the side of the information processing apparatus 10C through the connection of the video display apparatus 20C to the information processing apparatus 10C. The resistor 25C establishes a connection between a power line of +5 V that is required for operating the circuit of the video display apparatus 20C and the second wire 24C. This resistor 25C has a resistance value that is well smaller than the resistance value of the resistor 14C on the side of the information processing apparatus 10C. Herein, this resistor 25C generates the connection signal (HPD (Hot Plug Detect) signal that is herein a signal the signal level of which is as high as +5 V) representing the connection of the video display apparatus 20C to the information processing apparatus 10C, and transmits this signal to the second wire 24C.

An electric potential of the first wire 12C on the side of the information processing apparatus 10C is at a Vss (Voltage for substrate and source) (herein 0 V) in a non-connection state where the video display apparatus 20C is not connected to the information processing apparatus 10C. The display unit connection determining circuit 13C detects that the video display apparatus 20C is not connected because of the first wire 12C being at Vss. When the video display apparatus 20C is connected to the information processing apparatus 10C, the connection signal of +5 V, which is transmitted to the second wire 24C via the resistor 25C, is also transmitted to the first wire 12C. The display unit connection determining circuit 13C detects the connection signal of +5 V that is transmitted to the first wire 12C, and the information processing apparatus 10C recognizes that the video display apparatus 20C is connected. The information processing apparatus 10C outputs the video signals toward the video display apparatus 20C in the state where the video display apparatus 20C is connected thereto. The video signals, which are output toward the video display apparatus 20C from the information processing apparatus 10C, also contain clock signals, and herein a focus is put on the clock signals. The clock signals are herein differential signals and transmitted to a clock signal determining circuit 27C via two clock signal lines 26C. This clock signal determining circuit 27C is a circuit which determines whether the stable clock signals are transmitted or not. An output of the clock signal determining circuit 27C indicates whether the stable clock signals are transmitted or not.

A display unit 23C displays, corresponding to the output from the clock signal determining circuit 27C, the video when the stable clock signals are transmitted but does not display the video when not transmitted.

Figure 2:
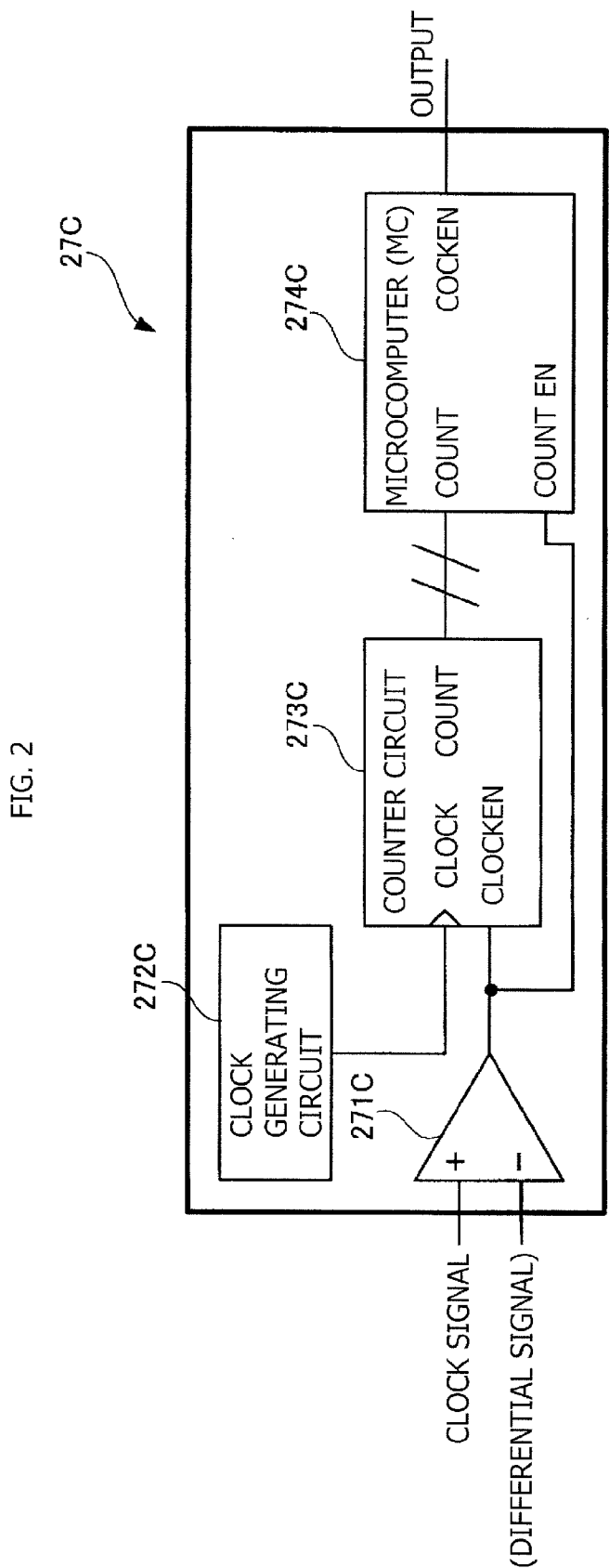
FIG. 2 is a block diagram illustrating one example of a clock signal determining circuit in the comparative example depicted in FIG. 1.

FIG. 2 is a block diagram illustrating one example of the clock signal determining circuit 27C in the comparative example depicted in FIG. 1.

The clock signals as the differential signals transmitted via the two clock signal lines 26C (see FIG. 1) from the information processing apparatus 10C are converted into normal signals by a differential buffer 271C. Further, a clock signal generating circuit 272C is a circuit that generates the clock signal of which a repetition frequency is well higher than the repetition frequency of the clock signal input to the differential buffer 271C. The clock signals generated by this clock signal generation circuit 272C are input to a counter circuit 273C, and the counter circuit 273C counts a clock number of the clock signals in synchronization with the output of the differential buffer 271C. The clock number counted by the counter circuit 273C is input to a microcomputer (which is hereinafter abbreviated to "MC") 274C. The MC 274C measures the clock number counted by the counter circuit 273C a plural number of times in synchronization with the output of the differential buffer 271C. Then, this MC 274C, if the clock number measured the plural number of times is stable, outputs a purport that the clock signals as the differential signals input to the differential buffer 271C are stable.

Herein, in the case of the clock signal determining circuit 27C illustrated in FIG. 2, the MC 274C adds up the clock numbers counted the plural number of times, and hence it takes a period of time till the clock signal determining circuit 27C outputs since the information processing apparatus 10C depicted in FIG. 1 has output the clock signal. This period of time is substantially coincident with a period of time required for the video display apparatus 20C to render several times or more on the screen, and ranges from a fraction of one second up to several seconds. During this period of time, the video signals are normally output from the information processing apparatus 10C, and nevertheless the video display apparatus 20C cannot display the video. Further, the information processing apparatus 10C stops outputting the video signals containing the clock signals, and nevertheless the input of the differential buffer 271C becomes unstable due to noises etc, with the result that the differential buffer 271C gets into malfunction as the case may be. If this malfunction occurs, it is determined that the information processing apparatus 10C outputs the video signals, while the video display apparatus 20C tries to display the video in spite of the video signals not being normal, and it follows that the unstable video is output.

Next, the embodiment of the present invention will be described based on the description of the comparative example given above.

Figure 3:
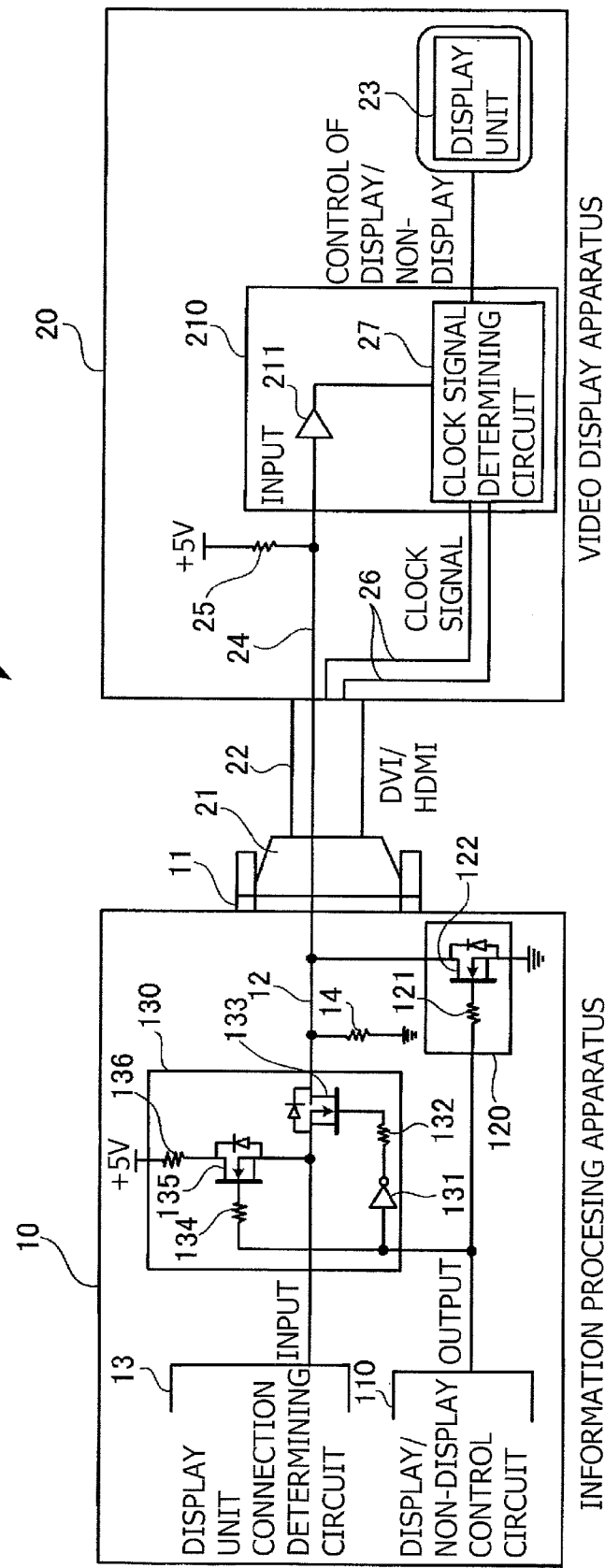
FIG. 3 is a block diagram illustrating a video display system by way of one embodiment of the present invention.

FIG. 3 is a block diagram illustrating the video display system by way of one embodiment of the present invention.

In the video display system depicted in FIG. 3, the elements corresponding to the respective elements of the video display system 1C illustrated in FIG. 1 are marked with the reference numerals from which the letter "C" suffixed in FIG. 1 is removed, and the explanations thereof might be omitted.

Also in the video display system 1 depicted in FIG. 3, similarly to the video display system 1C depicted in FIG. 1, only a characteristic portion of the embodiment is illustrated, while illustrations and explanations of other elements are omitted.

The video display system 1 depicted in FIG. 3 includes an information processing apparatus 10 and a video display apparatus 20. The video display apparatus 20 has a connector 21 and a cable 22, in which the connector 21 is connected to a connector 11 on the side of the information processing apparatus 10, thereby connecting the video display apparatus 20 to the information processing apparatus 10 via the connectors 11, 21 and the cable 22.

The information processing apparatus 10 is an apparatus which generates the video signals and outputs the video signals toward the video display apparatus 20. Further, the video display apparatus 20 is an apparatus which receives the video signals output from the information processing apparatus 10 and displays a video based on the video signals on a display unit 23. The information processing apparatus 10 and the video display apparatus 20 perform the communications based on the DVI or HDMI standard.

Further, the information processing apparatus 10 includes a first wire 12 and a display unit connection determining circuit 13. The first wire 12 is connected to a grounded line (which a second potential line as connoted herein) via a resistor 14 having a large resistance value. The first wire 12 is a wire for receiving transmission of a connection signal indicating a connection of the video display apparatus 20 to the information processing apparatus 10 from the side of the video display apparatus 20. Moreover, the display unit connection determining circuit 13 is a circuit which determines whether the connection of the video display apparatus 20 is established or not by monitoring the signal carried on the first wire 12.

On the other hand, the video display apparatus 20 includes a second wire 24 and a resistor 25. The second wire 24 is connected to the first wire 12 on the side of the information processing apparatus 10 through the connection of the video display apparatus 20 to the information processing apparatus 10. The resistor 25 establishes a connection between a power line of +5 V (a first potential line as connoted herein) that is required for operating the circuit of the video display apparatus 20 and the second wire 24. This resistor 25 has a resistance value that is well smaller than the resistance value of the resistor 14 on the side of the information processing apparatus 10. Herein, this resistor 25 is one example of a connection signal generating circuit as connoted herein. That is, the resistor 25 generates the connection signal (HPD (Hot Plug Detect) signal) representing the connection of the video display apparatus 20 to the information processing apparatus 10, and transmits this signal to the second wire 24. This connection signal (HPD signal) is a +5 V H-level signal as one example of a first electric potential.

An electric potential of the first wire 12 on the side of the information processing apparatus 10 is at Vss (Voltage for substrate and source) (herein 0V; L-level), which is one example of a second electric potential, in a non-connection state where the video display apparatus 20 is not connected to the information processing apparatus 10. The display unit connection determining circuit 13 detects that the video display apparatus 20 is not connected because of the first wire 12 being at Vss. When the video display apparatus 20 is connected to the information processing apparatus 10, the H-level connection signal, which is transmitted to the second wire 24 via the resistor 25, is also transmitted to the first wire 12. The display unit connection determining circuit 13 detects the connection signal of +5 V that is transmitted to the first wire 12, and the information processing apparatus 10 recognizes that the video display apparatus 20 is connected. The information processing apparatus 10 outputs the video signals toward the video display apparatus 20 in the state where the video display apparatus 20 is connected thereto. The video signals, which are output toward the video display apparatus 20 from the information processing apparatus 10, contain clock signals, and herein a focus is put on the clock signals. The clock signals are herein differential signals and transmitted to a clock signal determining circuit 27 via two clock signal lines 26. This clock signal determining circuit 27 is a circuit which determines whether the stable clock signals are transmitted or not.

This clock signal determining circuit 27 has, however, a different portion from the clock signal determining circuit 27C (see FIGS. 1 and 2) in the comparative example described above. To be specific, this clock signal determining circuit 27C outputs a display permission signal (which is herein the H-level signal) if the stable clock signals are output from the side of the information processing apparatus 10 and if a display stop instruction signal to instruct the video display apparatus 20 to stop displaying the video is not output from the information processing apparatus 10. Timing of starting the output of the display permission signal will be, however, described later on. On the other hand, when the clock signal determining circuit 27C receives the display stop instruction signal (which is herein the L-level signal) from the side of the information processing apparatus 10 even if the clock signal is detected, the clock signal determining circuit 27C outputs the display stop instruction signal.

The display unit 23 displays the video corresponding to the output from the clock signal determining circuit 27 when the display permission signal (the H-level signal) is output from the clock signal determining circuit 27 but does not display the video when a display inhibition signal (the L-level signal) is output.

Figure 4:
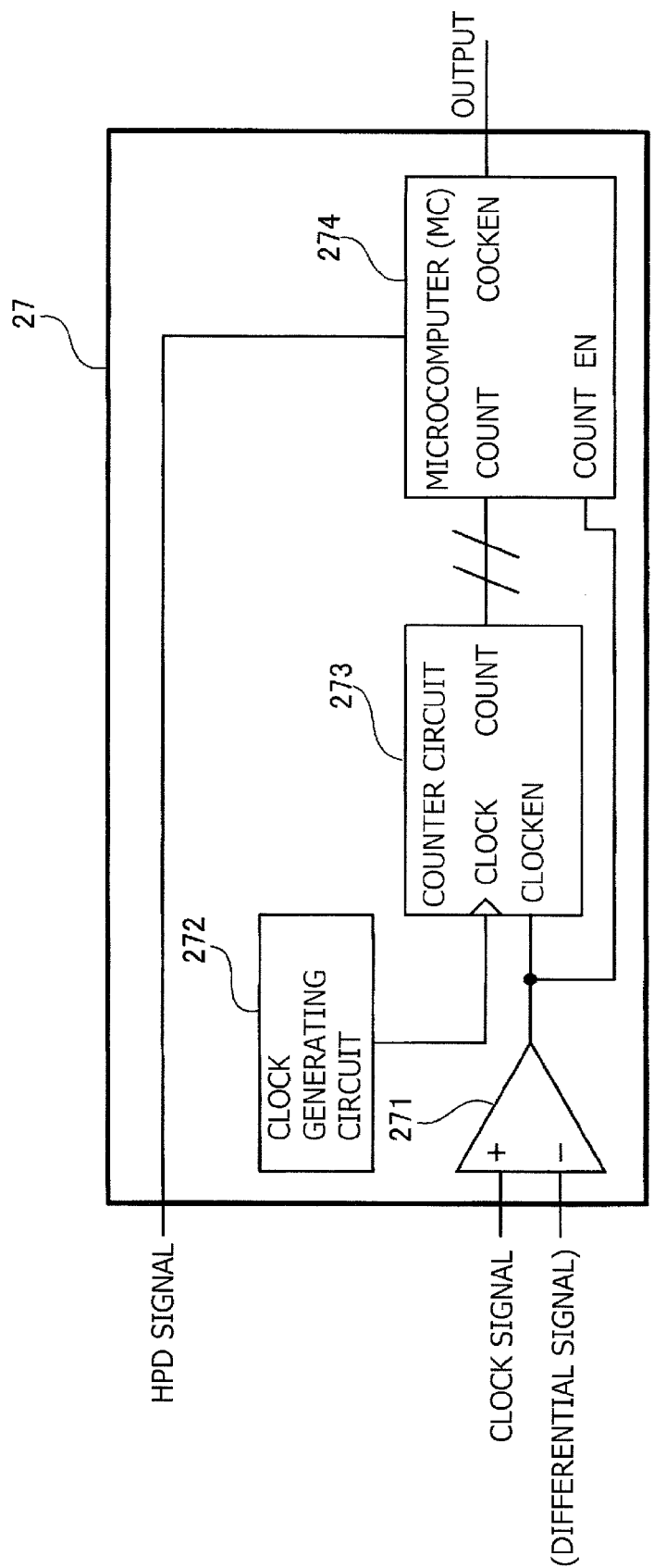
FIG. 4 is a block diagram illustrating an internal configuration of a clock signal determining circuit building up the video display apparatus of the video display system as one embodiment of the present invention illustrated in FIG. 3.

FIG. 4 is a block diagram illustrating an internal configuration of the clock signal determining circuit 27 building up the video display apparatus 20 of the video display system 1 as one embodiment of the present invention illustrated in FIG. 3.

The clock signals as the differential signals transmitted via two clock signal lines 26 (see FIG. 3) from the information processing apparatus 10 are converted into normal signals by a differential buffer 271. Further, a clock generation circuit 272 is a circuit that generates the clock signal of which a repetition frequency is well higher than the repetition frequency of the clock signal output from the differential buffer 271. The clock signals generated by this clock generation circuit 272 are input to a counter circuit 273, and the counter circuit 273 counts a clock number of the clock signals in synchronization with the output of the differential buffer 271. The clock number counted by the counter circuit 273 is input to a microcomputer (MC) 274. The MC 274 measures the clock number counted by the counter circuit 273 a plural number of times in synchronization with the output of the differential buffer 271. Then, this MC 274, if the clock number measured the plural number of times is stable and if a HPD signal that will be explained later on is at H-level, outputs the H-level display permission signal.

Whereas if the clock signals as the differential signals are not input to the differential buffer 271 and if the HPD signal is at the L-level (i.e., if the display stop instruction signal is output from the information processing apparatus 10), the L-level display inhibition signal is output.

Referring back to FIG. 3, the description will proceed.

The information processing apparatus 10 building up the video display system 1 depicted in FIG. 3 further includes a display/non-display control circuit 110, a drive circuit 120 and a pseudo connection signal transmission circuit 130 as the elements that do not exist in the video display system 1C in the comparative example illustrated in FIG. 1. Moreover, the video display apparatus 20 depicted in FIG. 3 has a display stop instruction detecting circuit 210 including the clock signal determining circuit 27 explained with reference to FIG. 4.

The display/non-display control circuit 110 in the information processing apparatus 10, when stopping the supply of the video signals toward the video display apparatus 20, outputs the display stop instruction signal (which is herein the H-level signal) simultaneously with stopping the video signals.

The drive circuit 120 is configured to include a resistor 121 and an NMOS (N-channel metal oxide semiconductor) transistor 122. The NMOS transistor 122 is disposed between the first wire 12 and the grounded line. Further, the resistor 121 is disposed between the display/non-display control circuit 110 and a gate of the NMOS transistor 122, and transmits an output signal of the display/non-display control circuit 110 to the gate of the NMOS transistor 122.

Furthermore, the pseudo connection signal transmission circuit 130 is configured to include a switch unit having an inverter 131, a resistor 132 and an NMOS transistor 133, and a pseudo connection signal generating unit having a resistor 134, an NMOS transistor 135 and a resistor 136. The inverter 131 inverts and outputs the output signal of the display/non-display control circuit 110. The resistor 132 is disposed between the output of the inverter 131 and the gate of the NMOS transistor 133, and transmits an output signal of the inverter 131 to the gate of the NMOS transistor 133. Moreover, the NMOS transistor 133 is disposed at a portion closer to the display unit connection determining circuit 13 than a portion at which the drive circuit 120 is connected on the first wire 12, and takes a role of connecting and disconnecting the first wire 12 at this portion.

Moreover, the resistor 134 is disposed between the output of the display/non-display control circuit 110 and the gate of the NMOS transistor 135, and transmits an output signal of the display/non-display control circuit 110 to the gate of the NMOS transistor 135. The NMOS transistor 135 and the resistor 136 are connected in series to each other, the NMOS transistor 135 is connected to the first wire 12, and the resistor 136 is connected to the power line of +5 V required for operating the circuit of the information processing apparatus 10.

Figure 5:
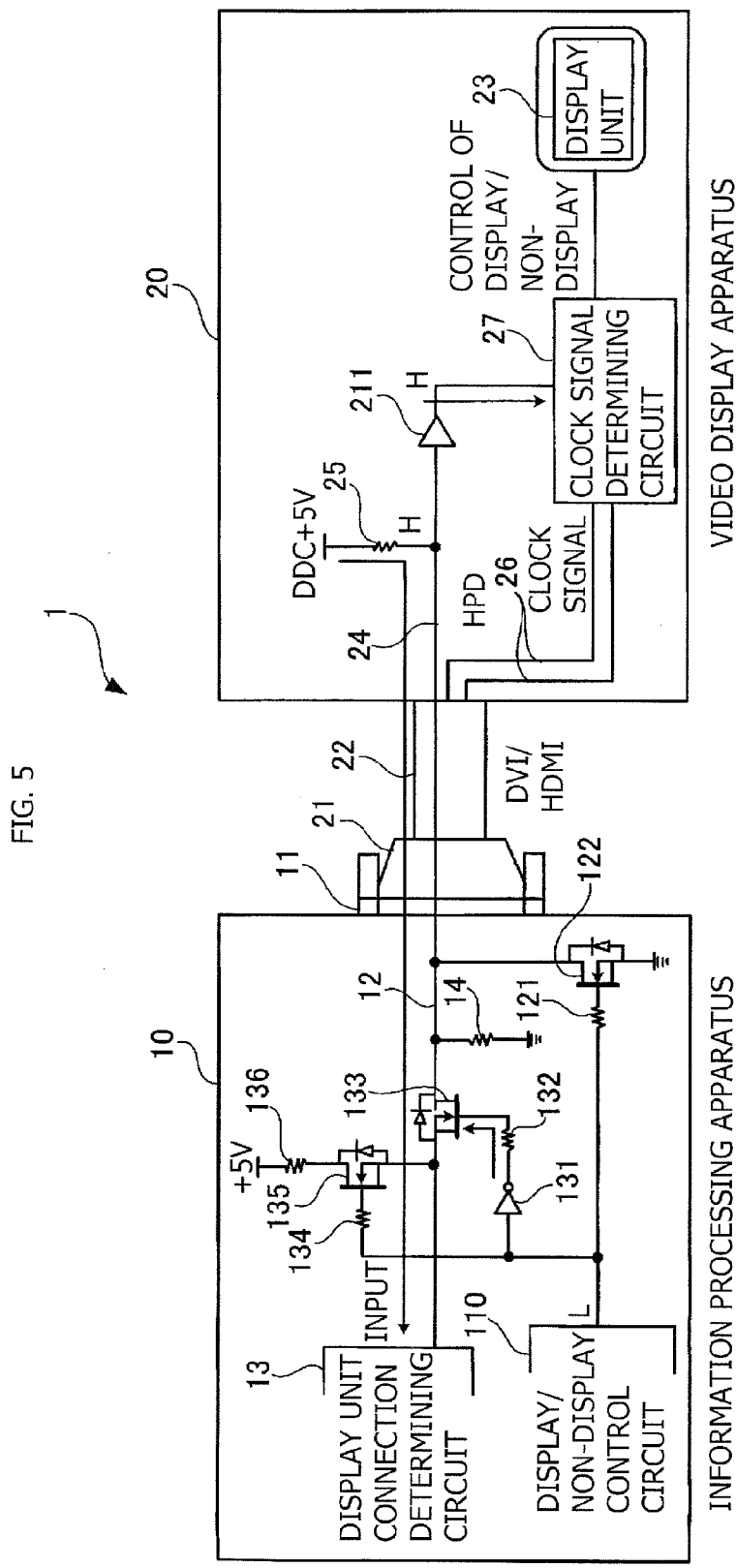
FIG. 5 is a diagram illustrating a state when outputting a video in the video display system depicted in FIG. 3.

Further, the display stop instruction detecting circuit 210 in the video display apparatus 20 includes a buffer circuit 211 in addition to the clock signal determining circuit 27 illustrated in FIG. 5. An input of the buffer circuit 211 is connected to the second wire 24, while an output of the buffer circuit 211 is connected to the clock signal determining circuit 27.

FIG. 5 is a diagram illustrating a state when outputting the video in the video display apparatus depicted in FIG. 3.

When outputting the video, the output of the display/non-display control circuit 110 of the information processing apparatus 10 is in the L-level state (the state where the display stop instruction signal is not output). At this time, the NMOS transistor 122 is in an OFF-state, the NMOS transistor 133 is in an ON-state because of being connected via the inverter 131, and the NMOS transistor 135 is in the OFF-state. When in these states, the first wire 12 and the second wire 24 are supplied with a power voltage (+5 V) via the resistor 25 and are in the H-level state. The display unit connection determining circuit 13 of the information processing apparatus 10 detects, from the first wire 12 being in the H-level state, that the video display apparatus 20 is connected.

Further, the H-level signal is input via the buffer circuit 211 to the clock signal determining circuit 27 of the video display apparatus 20. The clock signal determining circuit 27 recognizes, when receiving the input of the H-level signal from the buffer circuit 211, that the video is permitted to be displayed, and outputs the display permission signal toward the display unit 23. The display unit 23 displays, upon receiving the input of the display permission signal, the video based on the video signals.

Figure 6:
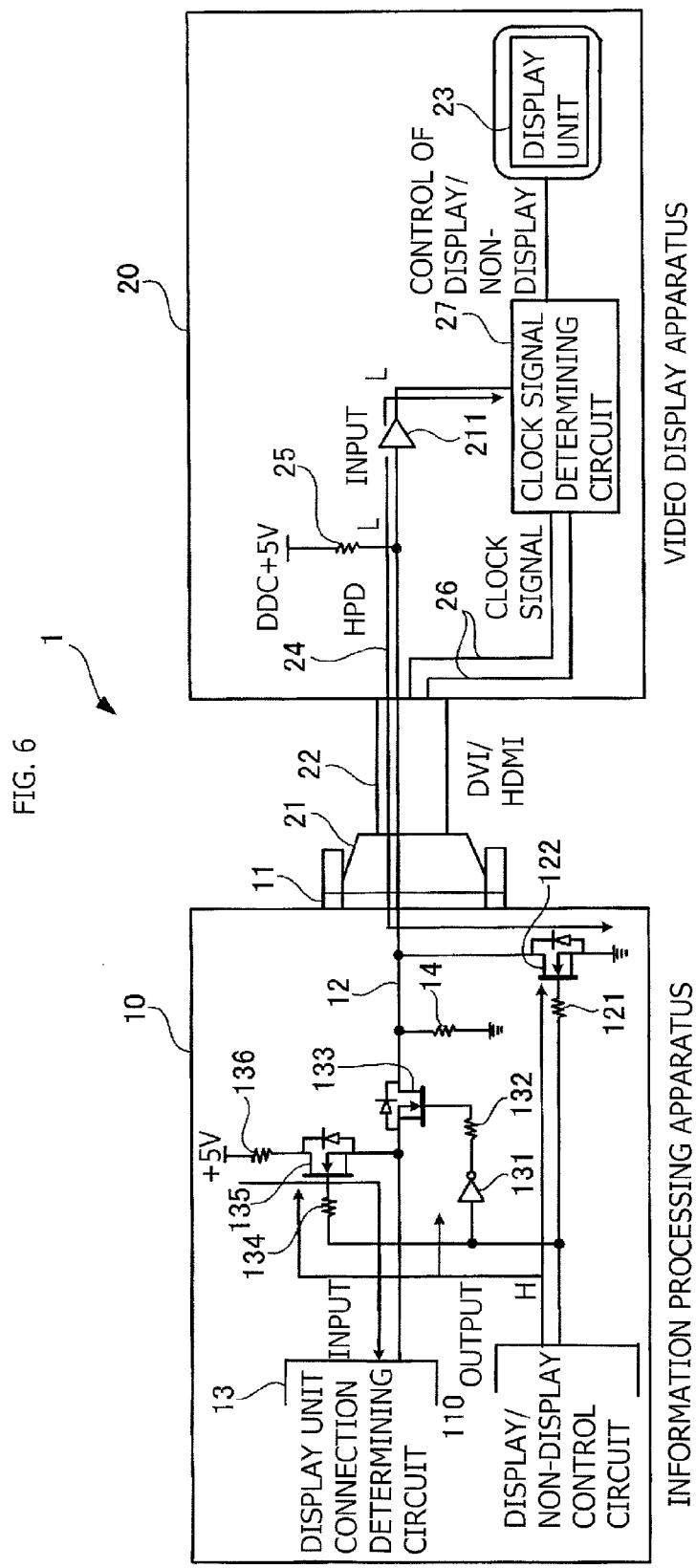
FIG. 6 is a diagram illustrating a state when stopping outputting the video in the video display system depicted in FIG. 3.

FIG. 6 is a diagram illustrating a state when stopping the output of the video in the video display system depicted in FIG. 3.

The information processing apparatus 10 stops, when stopping the output of the video in the video display apparatus 20, outputting the video signals containing the clock signals, and further outputs the H-level display stop instruction signal from the display/non-display control circuit 110. Then, the NMOS transistor 122 becomes the ON-state, the NMOS transistor 133 gets the OFF-state, and the NMOS transistor 135 comes to the ON-state. The resistor 25 is a resistor having a well smaller resistance value than that which the resistor 14 has but having a well larger resistance value than an equivalent resistance value of the NMOS transistor 122 kept in the ON-state. Accordingly, the NMOS transistor 122 gets ON-state, whereby the portion, closer to the second wire 24 than the NMOS transistor 133, of the first wire 12 and the second wire 24 become the L-level signal. The L-level display stop instruction signal is transmitted to the clock signal determining circuit 27 via the buffer circuit 211. Then, the clock signal determining circuit 27 outputs, even if the clock signal sent from the clock signal line 26 is mistakenly detected, the display stop instruction signal toward the display unit 23. The display unit 23, upon receiving the input of this display stop instruction signal, stops displaying the video.

Moreover, when the H-level display stop instruction signal is output from the display/non-display control circuit 110, as described above, the NMOS transistor 133 becomes the OFF-state, while the NMOS transistor 135 gets the ON-state. Then, a portion, closer to the display unit connection determining circuit 13 than the NMOS transistor 133, of the first wire 12 is supplied with Vss (+5 V) via the NMOS transistor 135 and is kept in the H-level state. Herein, the H-level signal supplied via the NMOS transistor 135 is referred to as a pseudo connection signal. The display unit connection determining circuit 13 cannot distinguish the connection signal transmitted via the resistor 25 from the pseudo connection signal and therefore recognizes that the video display apparatus 20 continuously remains to be connected.

When resuming the display of the video in the video display apparatus 20, the information processing apparatus 10 outputs the video signals toward the video display apparatus 20, and stops the output of the display stop instruction signal (H-level) by changing the output of the display/non-display control circuit 110 to the L-level.

The output stop (the L-level output) of the display stop instruction signal is immediately transmitted to the clock signal determining circuit 27, and the clock signal determining circuit 27 immediately outputs the display permission signal toward the display unit 23. The clock signal determining circuit 27 checks that the clock signals are stably supplied via the clock signal line 26 with a delay from the output of the display permission signal. In case the stable clock signals cannot be found, the display permission signal is temporarily canceled. In this case, an error process is executed in the video display apparatus 20.

According to the embodiment discussed above, the video display apparatus 20 makes, as they are, the most use of the signal lines (the first wire and the second wire) for transmitting the HPD signals which notify that the video display apparatus 20 is connected to the information processing apparatus 10, thereby enabling the output/inhibition of the video to be switched over at high speed while keeping compatibility with conventional machines.

Note that each of the drive circuit 120, the pseudo connection signal transmission circuit 130 and the display stop instruction detecting circuit 210 in the embodiment described above is nothing but one example and may be sufficient if configured to build up the idea of the present invention, but is not limited to the circuit configuration illustrated herein.

An aspect of the embodiments has a configuration that the display stop instruction signal is transmitted toward the video display apparatus from the information processing apparatus by using the first wire and the second wire as they are, via which to transmit the connection signal indicating that the video display apparatus is connected to the information processing apparatus. According to an aspect of the embodiments, the mis-detection and the malfunction are prevented, and the display stop instruction is promptly transmitted to the video display apparatus.

All example and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A video display system comprising:
an information processing apparatus to output video signals; and
a video display apparatus to be connected to the information processing apparatus and to display a video based on the video signals received from the information processing apparatus,
the information processing apparatus including:
a first wire to be supplied with a connection signal indicating a connection with the video display apparatus from the video display apparatus;
a connection determining circuit to determine, based on a signal on the first wire, whether the video display apparatus is connected or not;
a display control circuit to output a display stop instruction signal for giving an instruction to stop displaying the video on the video display apparatus;
a drive circuit to receive the display stop instruction signal and to validate the display stop instruction signal from the connection signal on the first wire; and
a pseudo connection signal transmission circuit to receive the display stop instruction signal and to transmit a pseudo connection signal in place of the connection signal to the connection determining circuit,
the video display apparatus including:
a connection signal generating circuit to generate the connection signal;
a second wire to be connected to the first wire of the information processing apparatus and to supply the connection signal to the first wire; and
a display stop instruction detecting circuit to detect the display stop instruction signal transmitted to the second wire via the first wire.

2. The video display system according to claim 1, wherein the connection signal generating circuit includes a first resistor to be connected between a first potential line and a second wire and to transmit a connection signal having a first electric potential to the second wire, and
the connection determining circuit detects, from the first wire being at a H-level signal potential, that the video display apparatus is connected.

3. The video display system according to claim 2, wherein the drive circuit makes the first wire transition to a second electric potential by receiving the display stop instruction signal from the display control circuit and connecting the first wire to the second potential line, and
the pseudo connection signal transmission circuit includes a switch to electrically cut off a second portion closer to the connection determining circuit than a first portion to which the drive circuit is connected on the first wire by receiving the display stop instruction signal from the display control circuit, and transmits a pseudo connection signal having the first electric potential to a third portion closer to the connection determining circuit than the second portion on the first wire.

4. An information processing apparatus to receive a connection of a video display apparatus to display a video based on received video signals, and to output the video signals toward the video display apparatus, the information processing apparatus comprising:
a first wire to be supplied with a connection signal indicating a connection with the video display apparatus from the video display apparatus;
a connection determining circuit to determine, based on a signal on the first wire, whether the video display apparatus is connected or not;
a display control circuit to output a display stop instruction signal for giving an instruction to stop displaying the video on the video display apparatus;
a drive circuit to receive the display stop instruction signal and to validate the display stop instruction signal from the connection signal on the first wire; and
a pseudo connection signal transmission circuit to receive the display stop instruction signal and to transmit a pseudo connection signal in place of the connection signal to the connection determining circuit.

* * * * *